(12) United States Patent
Lee et al.

(10) Patent No.: US 9,993,826 B2
(45) Date of Patent: Jun. 12, 2018

(54) HYDRATE PRODUCTION APPARATUS AND WATER TREATMENT APPARATUS USING SAME

(71) Applicant: KOREA INSTITUTE OF INDUSTRIAL TECHNOLOGY, Chungcheongnam-do (KR)

(72) Inventors: Ju Dong Lee, Busan (KR); Kyung Chan Kang, Daegu (KR); Seong Jun Cho, Gyeongsangnam-do (KR); Joung Ha Kim, Chungcheongnam-do (KR); Hyoung Chan Kim, Gimhae-si (KR)

(73) Assignee: KOREA INSTITUTE OF INDUSTRIAL TECHNOLOGY, Seobuk-gu, Cheonan-si, Chungcheongnam-do (KR)

( * ) Notice: Subject to any disclaimer, the term of this patent is extended or adjusted under 35 U.S.C. 154(b) by 0 days. days.

(21) Appl. No.: 15/520,219

(22) PCT Filed: Sep. 2, 2015

(86) PCT No.: PCT/KR2015/009214
§ 371 (c)(1),
(2) Date: Apr. 19, 2017

(87) PCT Pub. No.: WO2016/064085
PCT Pub. Date: Apr. 28, 2016

(65) Prior Publication Data
US 2017/0304841 A1    Oct. 26, 2017

(30) Foreign Application Priority Data
Oct. 24, 2014 (KR) .................. 10-2014-0144821

(51) Int. Cl.
*B02C 19/00* (2006.01)
*C02F 1/22* (2006.01)
(Continued)

(52) U.S. Cl.
CPC ............ *B02C 19/0018* (2013.01); *B01L 7/54* (2013.01); *B01L 99/00* (2013.01); *C02F 1/22* (2013.01); *C02F 1/34* (2013.01)

(58) Field of Classification Search
CPC ........ B01L 7/54; B01L 99/00; B02C 19/0018; C02F 1/22; C02F 1/34; C02F 1/68;
(Continued)

(56) References Cited

U.S. PATENT DOCUMENTS

2015/0232354 A1* 8/2015 Lee .......................... C02F 1/68
                                                        210/750

* cited by examiner

*Primary Examiner* — Sharon Pregler
(74) *Attorney, Agent, or Firm* — PatShegen IP

(57) ABSTRACT

A hydrate production apparatus according to the present invention comprises: a main body unit having a reaction space in which a hydrate is produced therein; an inlet pipe unit connected to one side of the main body unit so as to introduce, into the reaction space, a host material and a guest material for producing the hydrate; an outlet pipe unit connected to the other side of the main body unit so as to discharge the hydrate produced in the reaction space to the outside; and a pulverizing device unit provided inside the reaction space so as to increase a reaction area for producing the hydrate by pulverizing, into fine-sized particles, an object to be pulverized, which is at least one of the introduced host material and guest material.

18 Claims, 7 Drawing Sheets

(51) Int. Cl.
*C02F 1/34* (2006.01)
*B01L 7/00* (2006.01)
*B01L 99/00* (2010.01)

(58) Field of Classification Search
CPC .............. C02F 2101/10; C02F 2103/08; C02F 2303/18; C02F 1/265; C02F 1/683; C02F 2103/007; C02F 2209/02; C02F 2209/03
See application file for complete search history.

[Fig. 1]
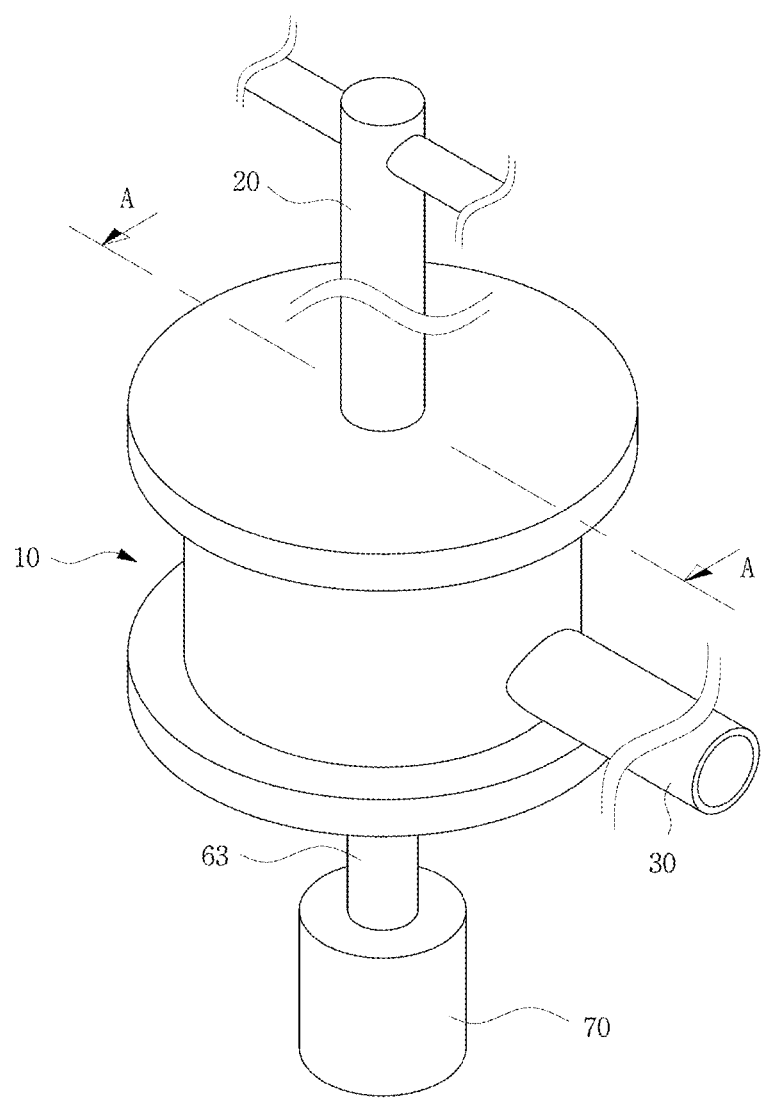

[Fig. 2]
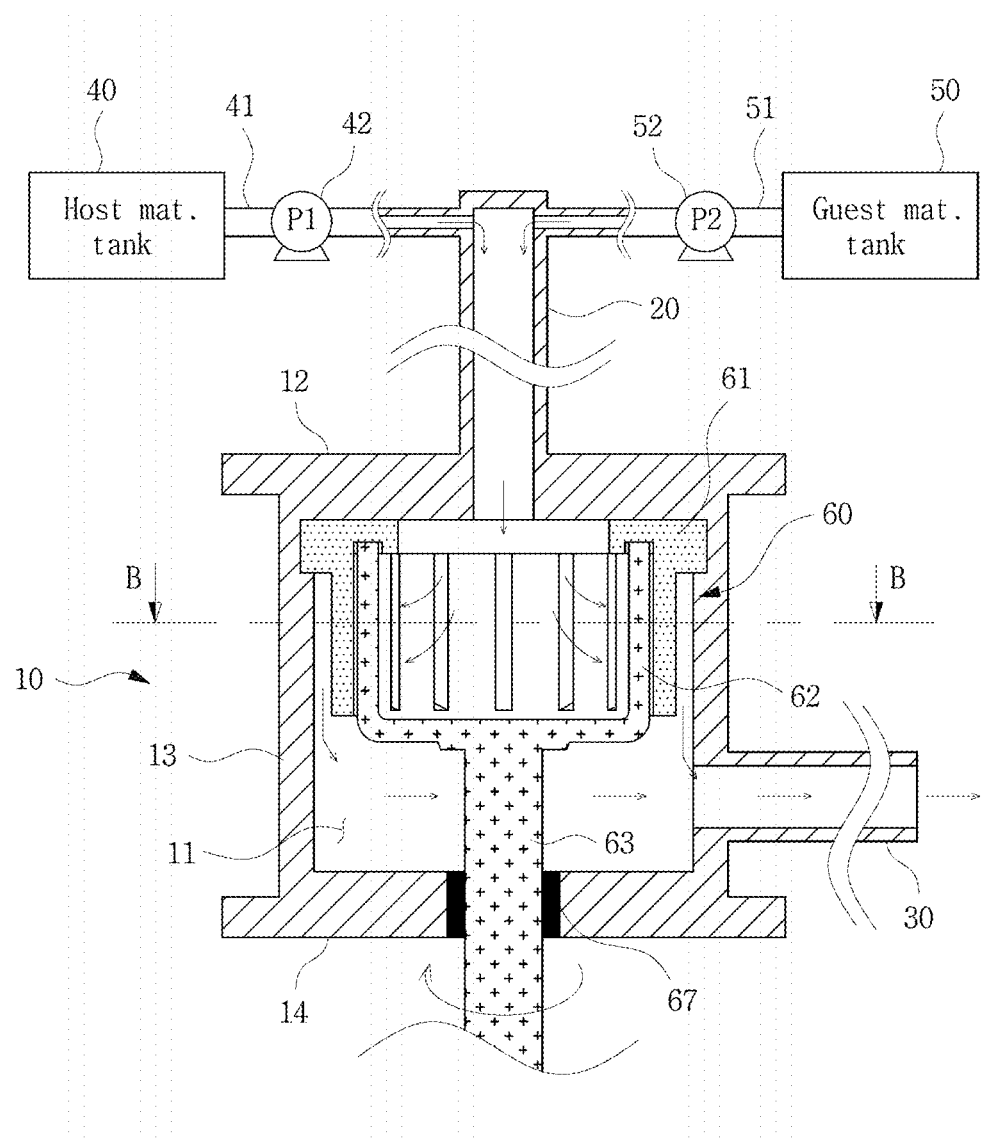

[Fig. 3]
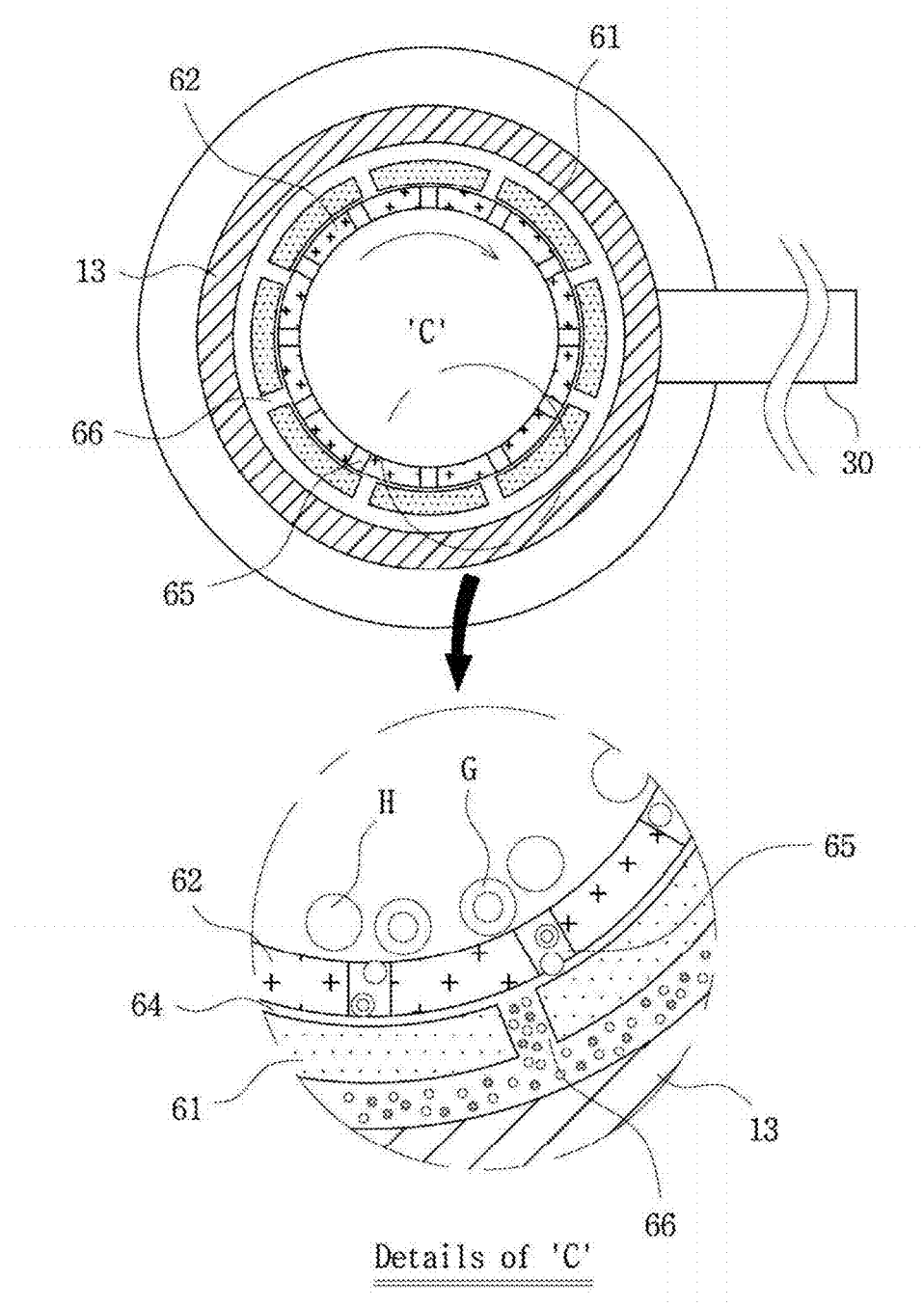
Details of 'C'

[Fig. 4a]
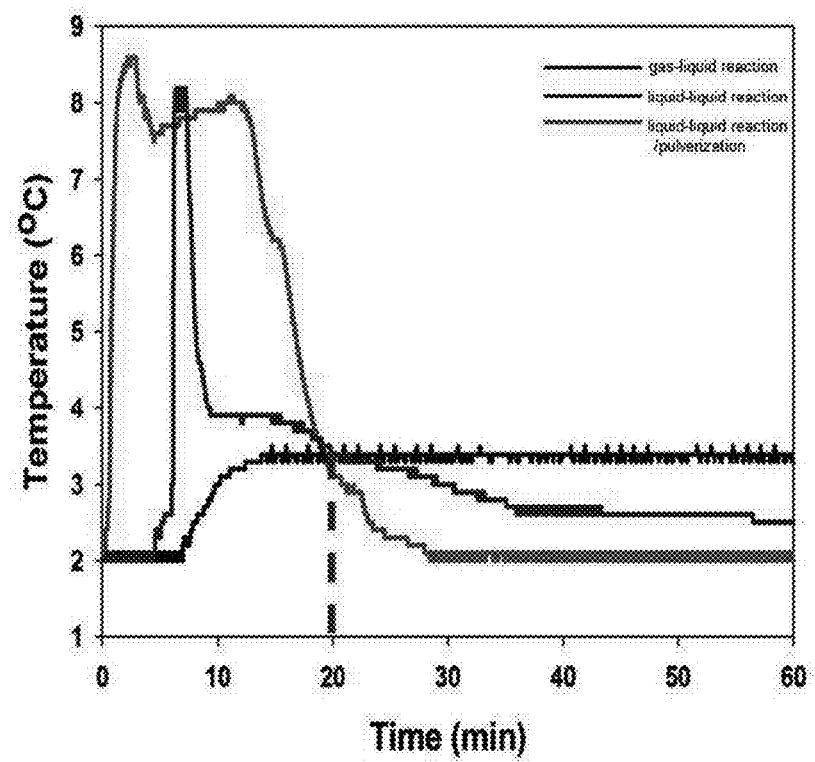
[Fig. 4b]
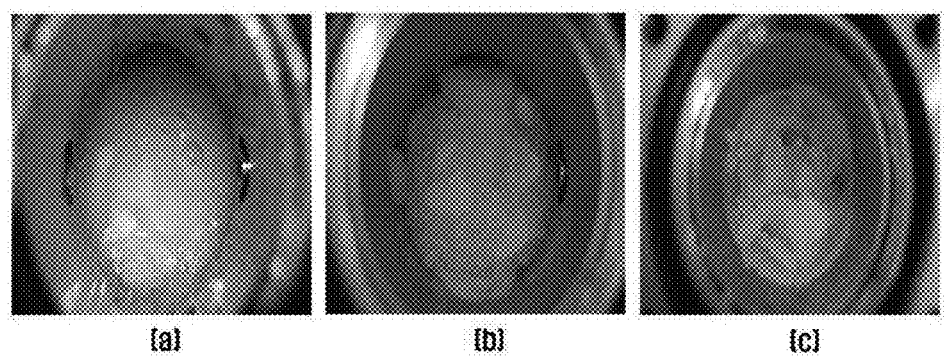
[a] [b] [c]

[Fig. 5]
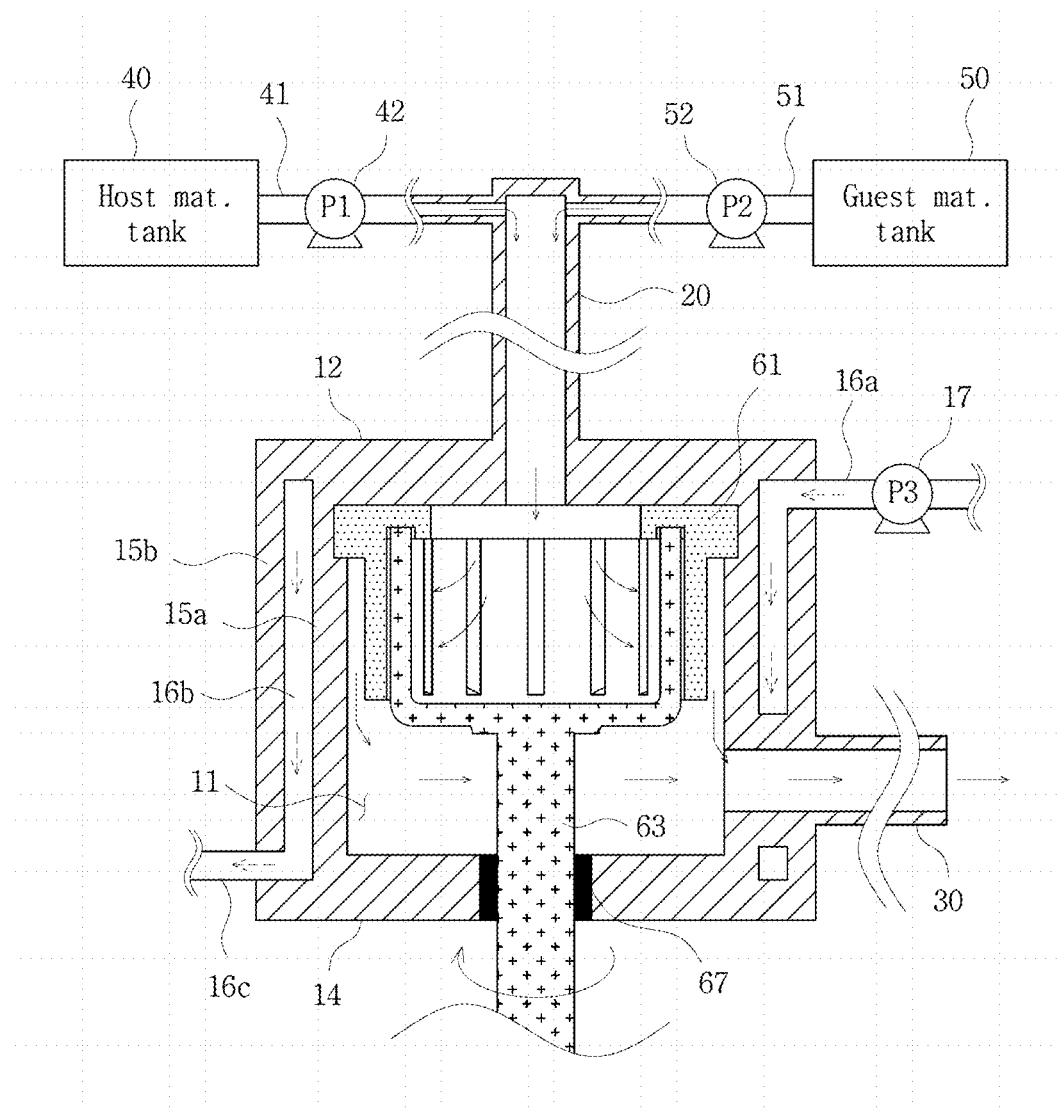

[Fig. 6]
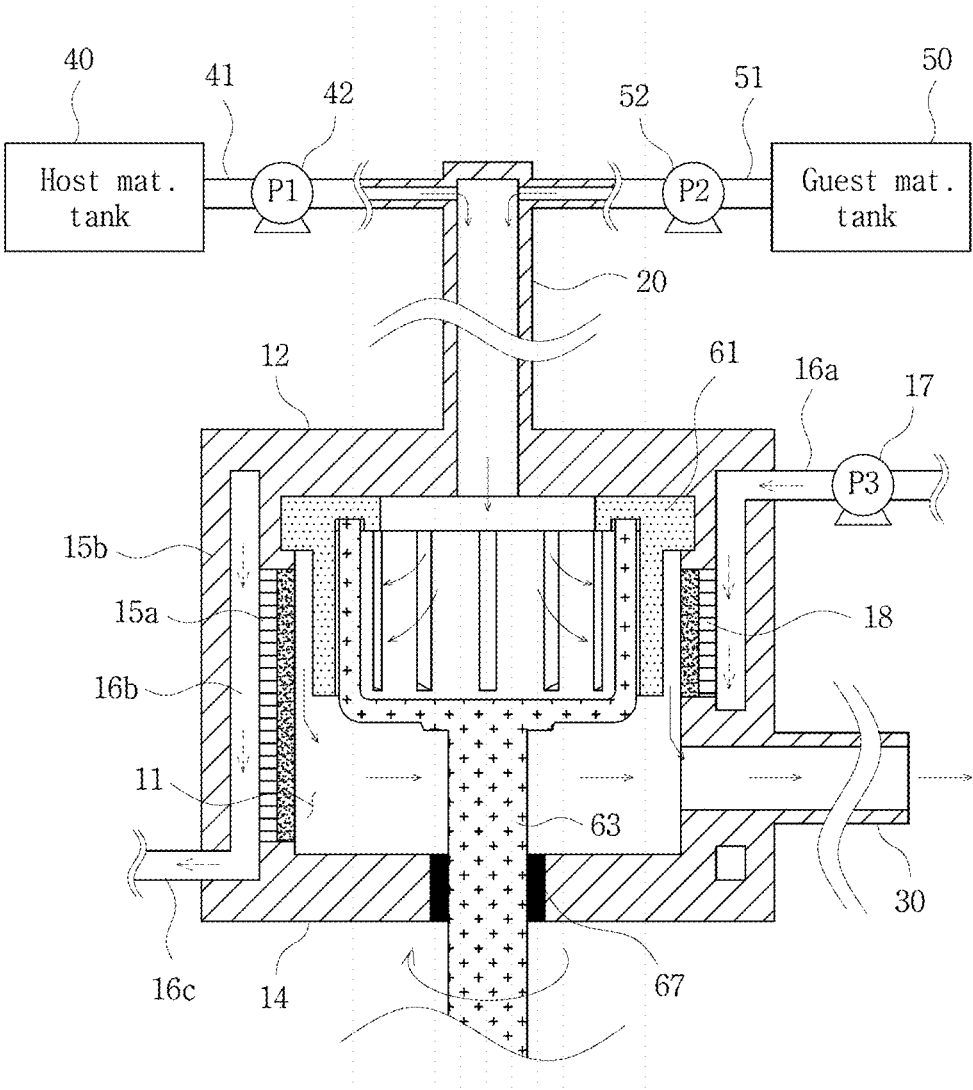

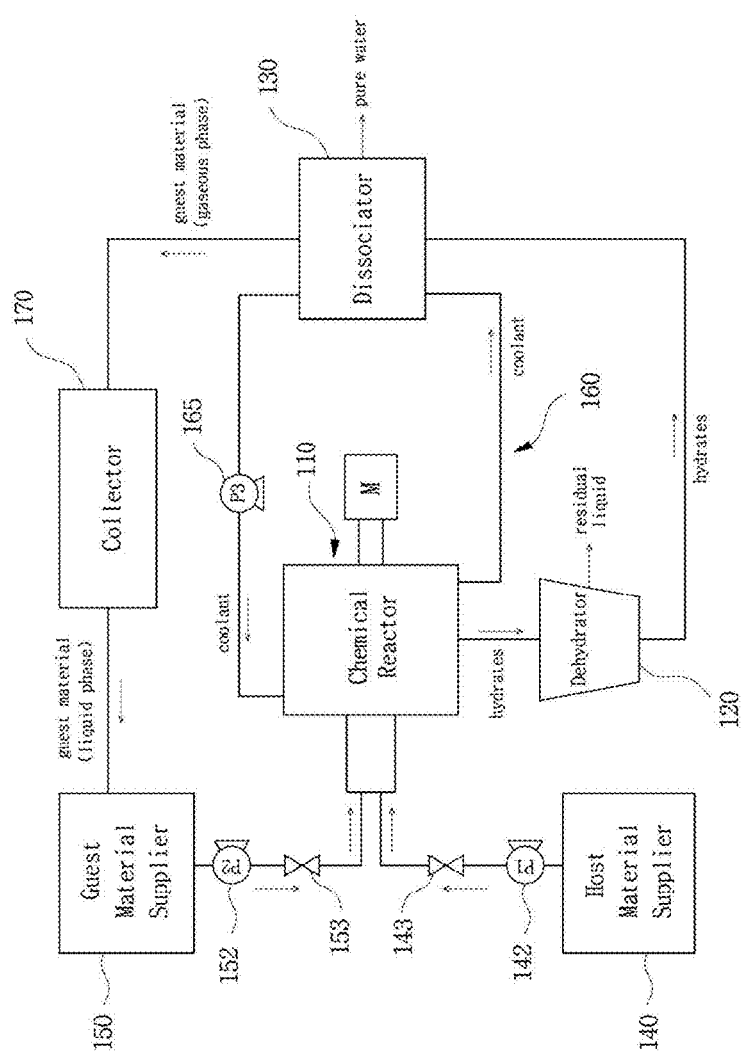
[Fig. 7]

HYDRATE PRODUCTION APPARATUS AND WATER TREATMENT APPARATUS USING SAME

TECHNICAL FIELD

The present invention relates to a hydrate forming apparatus and a water treatment apparatus using the same, and more particularly, to a hydrate forming apparatus capable of increasing a contact area between a host material and a guest material that flow through an inlet of a chemical reactor by pulverizing the host material and the guest material into micro-sized particles to notably increase hydrate forming efficiency and a water treatment apparatus using the same.

BACKGROUND ART

A technology of desalinating seawater that is one of water treatment technologies is a representative technology field capable of solving domestic and foreign demand of water, providing an alternative water resource securing technology, developing overseas markets, and simultaneously creating high added values, and a market of such desalination of seawater currently has a scale of three million tons per day and is expected to grow to a scale of six million and two hundred thousand tons per day in 2015.

Also, since the technology of desalinating seawater becomes a solution for providing alternative water resources to domestic and foreign areas short of water, and particularly, reduces costs and improves environmental problems by replacing a water resource providing method using building dams that raises controversy in environmental problem, it is expected that a demand thereof continuously increases in the future.

As the method of desalinating seawater described above, conventionally, an evaporation method and a reverse osmosis method have been applied. However, since the evaporation method is not economic due to a large consumption amount of energy necessary for water evaporation and needs a large amount of all sorts of facilities, recently, a method of desalinating seawater using the reverse osmosis method is generally used.

However, even in the case of such a reverse osmosis method, since there are a complicated pretreatment process, frequent replacement of reverse osmosis membrane, and a large amount of energy consumed to process seawater with high salt concentration, a new seawater desalination technology for replacing or complementing the same is necessarily required.

For this, recently, research and development of water treatment including desalination of seawater using a principle of forming gaseous hydrates have been performed. The content related to a water treatment technology using the principle of forming gaseous hydrates is disclosed in detail in following [Document 1] filed by the applicant of the present invention.

Since the water treatment technology using the principle of forming gaseous hydrates is a method of obtaining pure water by introducing a gaseous guest material to target water of treatment such as seawater and dissociating gaseous hydrates formed by a reaction therebetween, water treatment efficiency depends on forming efficiency of gaseous hydrates. However, despite many advantages, the conventional water treatment technology using the principle of forming gaseous hydrates has a difficulty in replacing the reverse osmosis method due to low efficiency of forming gaseous hydrates.

[Document 1] Korean Patent Publication No. 2009-0122811 (published on Dec. 1, 2009)

DISCLOSURE OF INVENTION

Technical Problem

It is an aspect of the present invention to address a problem of conventional technology described above and to provide a hydrate forming apparatus capable of increasing a contact area between a host material and a guest material that flow through an inlet of a chemical reactor by pulverizing the host material and the guest material into micro-sized particles to notably increase hydrate forming efficiency and a water treatment apparatus using the same.

It is another aspect of the present invention to provide a hydrate forming apparatus capable of more notably improving the efficiency of forming hydrates by using at least one of liquid $SF_6$, CFC-based materials, HCFC-based materials, PFC-based materials, and HFC-based materials which are with notably high frequency of contact with water molecules when compared with a gaseous phase and can form hydrates under conditions at a relatively lower pressure and at a higher temperature than other conventionally used guest materials, as a guest material.

Technical Solution

One aspect of the present invention provides a hydrate forming apparatus including a main body in which a reaction space in which hydrates are formed is provided, an inlet pipe connected to one side of the main body and through which a host material and a guest material for forming the hydrates flow into the reaction space, an outlet pipe connected to another side of the main body and through which the hydrates formed in the reaction space are discharged outward, and a pulverizer installed in the reaction space to increase a reaction area for forming the hydrates by pulverizing a target material of pulverization that is at least one of the host material and the guest material that flow into the reaction space.

The pulverizer may include a cylindrical stator fixedly installed in the reaction space and with a center connected to the inlet pipe, through which the target material of pulverization flows into the cylindrical stator and a cylindrical rotor installed at the center of the stator to be rotatable and configured to accommodate the target material of pulverization that flows into the reaction space therein. Here, an outer surface of the rotor and an inner surface of the stator may be spaced apart at a certain gap, and a plurality of flow channels through which the target material of pulverization accommodated in the rotor is discharged into the gap by a rotational force may be formed at a side surface of the rotor.

Also, a plurality of flow channels through which the target material of pulverization discharged into the gap is discharged into the reaction space may be formed at a side surface of the stator.

Also, the pulverizer may include a cylindrical rotor installed in the cylindrical reaction space to be rotatable and configured to accommodate the target material of pulverization that flows through a center connected to the inlet pipe in the cylindrical rotor. Here, an outer surface of the rotor and an inner surface of the main body may be spaced apart at a certain gap, and a plurality of flow channels through which the target material of pulverization accommodated in the rotor is discharged into the gap by a rotational force may be formed at a side surface of the rotor.

The host material may be contaminated water or seawater that is target water of treatment. Here, the guest material may be at least one of gaseous or liquid $SF_6$, CFC-based materials, HCFC-based materials, PFC-based materials, and HFC-based materials.

Also, a thermoelement module that maintains a temperature inside the inlet pipe or the reaction space to be within a predetermined temperature range may be installed on at least one side of the inlet pipe and the main body, and a cooling surface of the thermoelement module may be installed toward the inside of the inlet pipe or toward the reaction space, and an exothermic surface of the thermoelement module may be installed toward an outer surface of the inlet pipe or the main body.

Also, the main body may include a first body that forms the reaction space therein, a second body formed in a jacket structure at an outer surface of the first body to form a cooling space between the first body and the second body, and a cooling module that allows a cooling fluid to flow through the cooling space to maintain a temperature inside the reaction space to be within a predetermined temperature range.

Also, the main body may further include a thermoelement module installed on at least one side of the first body. Here, a cooling surface of the thermoelement module may be installed toward the reaction space and an exothermic surface may be installed toward the cooling space.

Another aspect of the present invention provides a water treatment apparatus including a chemical reactor that forms hydrates in a reaction space therein and discharges the hydrates, a host material supplier that supplies target water of treatment that is a host material for forming the hydrates to the reaction space in the chemical reactor, a guest material supplier that supplies a guest material for forming the hydrates to the reaction space in the chemical reactor, a dehydrator that dehydrates the discharged hydrates, and a dissociator that separates the dehydrated hydrates into treated water and the guest material and discharges the treated water and the guest material. Here, the chemical reactor includes a main body that forms a reaction space therein and a pulverizer installed in the reaction space to increase a reaction area for forming the hydrates by pulverizing a target material of pulverization that is at least one of the host material and the guest material that flow into the reaction space, into micro-sized particles.

Also, the main body may include a first body that forms the reaction space therein, a second body formed in a jacket structure at an outer surface of the first body to form a cooling space between the first body and the second body, and a cooling module that allows a cooling fluid to flow through the cooling space to maintain a temperature inside the reaction space to be within a predetermined temperature range.

Also, the main body may further include a thermoelement module installed on at least one side of the first body. Here, a cooling surface of the thermoelement module may be installed toward the reaction space and an exothermic surface may be installed toward the cooling space.

Also, the dissociator may have a jacket structure in which a heating space is formed between an internal body that forms a dissociation space in the dissociator and an external body formed on an outer surface of the internal body, and the cooling module may be configured to circulate a cooling fluid through the cooling space of the main body of the chemical reactor and the heating space of the dissociator.

Also, the water treatment apparatus may further include a collector that collects and supplies again the guest material discharged from the dissociator to the guest material supplier.

Also, the guest material supplied to the reaction space may be at least one of liquid $SF_6$, CFC-based materials, HCFC-based materials, PFC-based materials, and HFC-based materials, and the collector may liquefy a gaseous guest material collected from the dissociator and supply the guest material to the guest material supplier again.

Advantageous Effects

Since a hydrate forming apparatus and a water treatment apparatus using the same according to the present invention are configured to increase a contact area between a host material and a guest material that flow through an inlet of a chemical reactor by pulverizing the host material and the guest material into micro-sized particles using a pulverizer installed in the chemical reactor, compared with a conventional technology of simply injecting a host material and a guest material into a chemical reactor, hydrate forming efficiency may be notably increased.

Also, since the hydrate forming apparatus and the water treatment apparatus using the same according to the present invention use at least one of liquid $SF_6$, CFC-based materials, HCFC-based materials, PFC-based materials, and HFC-based materials as a guest material, not only hydrates may be formed under conditions at a relatively low pressure and a high temperature but also a speed of forming hydrates becomes notably quick compared with a case of using a gaseous guest material to further notably increase hydrate forming efficiency.

Also, since the water treatment apparatus according to the present invention is configured to perform heat exchange between a chemical reactor at which formation heat of hydrates is generated and a dissociator that needs calories for dissociating hydrates, energy consumption necessary for operating the water treatment apparatus may be minimized.

BRIEF DESCRIPTION OF DRAWINGS

FIG. 1 is a perspective view illustrating a configuration of a hydrate forming apparatus according to a first embodiment of the present invention, FIG. 2 is a cross-sectional view illustrating a part taken along A-A line of FIG. 1, FIG. 3 is a cross-sectional view illustrating a part taken along B-B line of FIG. 2, FIGS. 4a and 4b are views illustrating an experimental result of comparing hydrate forming efficiencies of a case of using a pulverizer applied to the hydrate forming apparatus according to the present invention and a case of using no pulverizer, FIGS. 5 and 6 are cross-sectional views illustrating configurations of hydrate forming apparatuses according to a second embodiment and a third embodiment of the present invention, respectively, and FIG. 7 is a block diagram illustrating a configuration of a water treatment apparatus using the hydrate forming apparatus according to the first to fourth embodiments of the present invention.

MODE FOR INVENTION

Hereinafter, exemplary embodiments of the present invention will be described with reference to the attached drawings.

FIG. 1 is a perspective view illustrating a configuration of a hydrate forming apparatus according to a first embodiment of the present invention, FIG. 2 is a cross-sectional view illustrating a part taken along A-A line of FIG. 1, and FIG. 3 is a cross-sectional view illustrating a part taken along B-B line of FIG. 2.

The hydrate forming apparatus according to the first embodiment of the present invention includes a main body 10 with a reaction space 11 in which a hydrate is formed, an inlet pipe 20 connected to one side of the main body 10 and through which a host material H and a guest material G for forming the hydrate flow into the reaction space 11, and an outlet pipe 30 connected to another side of the main body 10 to discharge the hydrate formed in the reaction space 11 outward.

In the embodiment, for example, the main body 10 is formed in a cylindrical shape, the inlet pipe 20 is configured to pass through a center of a top surface 12 of the main body 10 to be connected to the reaction space 11, and the outlet pipe 30 is configured to pass through a side surface 13 of the main body 10 to be connected to the reaction space 11.

Also, a host material tank 40 and a guest material tank 50 that supply the host material H and the guest material G for forming the hydrate are connected to the inlet pipe 20 through a first supply pipe 41 and a second supply pipe 51, respectively.

Also, in the middle of the first supply pipe 41 and the second supply pipe 51, first and second supply pumps 42 and 52 for supplying the host material H and the guest material G are installed and control valves (not shown) for controlling supplying of the host material H and the guest material G may be further installed as necessary.

Here, an end of at least one of the first supply pipe 41 and the second supply pipe 51 connected to the inlet pipe 20 may be configured as a venturi tube or a nozzle pipe. When configured as described above, since inflow velocities of a host material and a guest material to the inside of the inlet pipe 20 are greatly increased, mixing of the both materials is better performed, thereby further improving forming efficiency of hydrates.

Also, in the embodiment, it is described as an example that an outlet (that is, a part connected to the reaction space) of the inlet pipe 20 is formed in a general tubular shape. However, as necessary, the outlet of the inlet pipe 20 may be configured as a venturi tube or a nozzle pipe.

Also, the host material H is target water for treatment and may be contaminated water (sewage, wastewater and the like) that needs decontamination or seawater that needs desalination.

Also, the guest material G may be in a gaseous phase or a liquid phase and may be at least one of $CH_4$, $C_2H_6$, $C_3H_8$, $CO_2$, $H_2$, $Cl_2$, $SF_6$, CFC-based materials, HCFC-based materials, PFC-based materials, and HFC-based materials in the case of the gaseous phase and may be at least one of $SF_6$, CFC-based materials, HCFC-based materials, PFC-based materials, and HFC-based materials in the case of the liquid phase.

In the embodiment, for example, seawater was used as the host material H and a gaseous or liquid refrigerant HFC-134a was used as the guest material G.

Also, the main body 10 is configured to further include a pulverizer 60 that is installed in the reaction space 11 and pulverizes the host material H and the guest material G that flow therein into micro-sized particles.

Here, the pulverizer 60 performs a function of notably increasing efficiency in forming hydrates by increasing a reaction area of particles for forming hydrates (that is, a contact area between the particles) by pulverizing a mixture of the host material H and the guest material G that flow therein through the inlet pipe 20 into micro-sized particles as described above.

In the embodiment, the pulverizer 60 includes a stator 61 fixedly installed in the reaction space 11 and a rotor 62 installed in the stator 61 to be rotatable.

Also, the stator 61 is formed in a hollow cylindrical shape with a top surface (that is, a surface connected to the inlet pipe) and a bottom surface that are open. Here, the host material H and the guest material G flow into a cylinder through a hollow center connected to the inlet pipe 20.

Also, the rotor 62 is formed in a drum type cylinder with an open top surface connected to the inlet pipe 20 and accommodates the host material H and the guest material G that flow therein, in the cylinder.

Also, the rotor 62 is configured to form a certain gap 64 between an outer surface thereof and an inner surface of the stator 61, and a plurality of slit-shaped flow channels 65 that discharge the host material H and the guest material G accommodated in the drum type cylinder toward the gap 64 due to a rotational force generated as described below are formed in a side surface of the rotor 62.

Also, a plurality of slit-shaped flow channels 66 that discharge the host material H and the guest material G discharged through the gap 64 into the reaction space 11 are formed at a side surface of the stator 61.

The rotor 62 configured as described above is configured to rotate in the stator 61. For this, a rotating shaft 63 that passes through a bottom surface 14 of the main body 10 and is connected to an external driving motor 70 is formed at a bottom surface of the rotor 62 to be coupled therewith.

Here, more preferably, a sealing type bearing 67 may be installed between the bottom surface 14 of the main body 10 through which the rotating shaft 63 passes and the rotating shaft 63 to maintain airtightness of the reaction space 11 and allow the rotating shaft 63 to easily rotate.

In the pulverizer 60 configured as described above according to the embodiment, when the rotor 62 rotates due to the driving motor 70, the host material H and the guest material G are discharged toward the gap 64 along the slit-shaped flow channels 65 formed in a radial shape, due to a rotation force thereof (that is, centrifugal force).

Also, the host material H and the guest material G discharged as described above may be directly discharged from the gap 64 to the reaction space 11 but may be discharged into the reaction space 11 along the slit-shaped flow channels 66 formed at the stator 61.

The host material H and the guest material G discharged as described above, as shown in an enlarged view of FIG. 3, are primarily pulverized by rotational force while passing through the slit-shaped flow channels 65 of the rotor 62 and secondarily pulverized by rotary shearing force generated between the rotor 62 and the stator 61 at the gap 64 to be discharged as very micro-sized particles into the reaction space 11 in such a way that reaction areas (that is, contact areas) among particles for forming hydrates are increased to improve efficiency in forming hydrates.

Also, a discharge pump for discharging hydrates formed in the reaction space 11 outward may be further installed at the outlet pipe 30. However, in the embodiment, since the pulverizer 60 is configured as a dispersion pump for dispersing a heterotypic fluid in an atomized emulsion shape to discharge as described above, an additional discharge pump may be omitted.

Meanwhile, in the embodiment, it has been described as one example that the pulverizer 60 includes the stator 61 and the rotor 62. However, the pulverizer 60 is not limited thereto and the stator 61 may be omitted as necessary.

Merely, in this case, the outer surface of the rotor 62 may be configured to form the certain gap 64 from an inner surface of the main body 10 that forms the reaction space 11.

Also, in the embodiment, it has been described as one example that the pulverizer 60 is configured as a dispersion pump type. However, the pulverizer 60 is not limited thereto. The pulverizer 60 may be implemented in several other well-known methods such as a micro bubbler (in the case of a gaseous phase) within a range of performing a function of pulverizing gases or a liquid into micro particles.

Also, in the embodiment, it has been described as one example that the slit-shaped flow channels 65 and 66 of the stator 61 and the rotor 62 are formed in a longitudinal direction of the cylinders at the side surfaces of the stator 61 and the rotor 62. However, the slit-shaped flow channels 65 and 66 are not limited thereto and may be formed in a circumferential direction or a spiral direction as necessary.

Also, in the embodiment, it has been described as one example that flow channels 65 and 66 of the stator 61 and the rotor 62 are formed in a slit shape. However, the flow channels 65 and 66 are not limited thereto and may be formed in various shapes such as a circular hole shape, an elliptical hole shape, a mesh shape and the like within a range of performing the same function.

Also, widths and lengths of the slit-shaped flow channels 65 and 66 of the stator 61 and the rotor 62, a size of the gap 64, a rotational speed of the rotor 62 and the like may be determined considering a size of pulverized particles, a load on the driving motor, a discharge speed (or a discharge amount) of formed hydrates and the like as necessary.

Particularly, the size of the gap 64 may be determined within a range of several microns to several mm as necessary. However, it is more preferable to set the size of the gap 64 to be within a range from 0.1 mm to 1 mm when considering efficiency in forming hydrates and driving efficiency of the pulverizer 60.

Also, in the embodiment, it has been described as one example that the pulverizer 60 pulverizes all the host material H and the guest material G. However, the pulverizer 60 is not limited thereto and may be configured to pulverize only one of the host material H and the guest material G as necessary by separately forming inlet paths of the host material H and the guest material G.

Also, in the embodiment, it has been described as one example that the pulverizer 60 is configured to pulverize a mixture of the host material H and the guest material G that flow through the inlet pipe 20. However, the pulverizer 60 is not limited thereto and may be formed at each of the inlet paths of the host material H and the guest material G separately, as necessary.

Meanwhile, to evaluate an effect of the pulverizer 60 applied to the present invention on hydrate forming efficiency, hydrate forming efficiencies of three cases including (a) case of using a gaseous refrigerant HFC-134a as the guest material G, (b) case of using a liquid refrigerant HFC-134a as the guest material, and (c) case of using a liquid refrigerant HFC-134a and employing the pulverizer according to the present invention were evaluated through experiments and results thereof are shown in FIGS. 4a and 4b.

First, FIG. 4a is a graph illustrating a change in temperature of a reaction space in a main body according to a reaction time.

Generally, the main body described above is configured to maintain a pressure condition and a temperature condition of the inside of the reaction space for forming hydrates. However, since a forming reaction of hydrates is an exothermic reaction, a change in temperature of the inside of the reaction space occurs according to forming of hydrates.

Accordingly, when considering the change in temperature of the inside of the reaction space, a speed of the forming reaction and forming efficiency of hydrates may be known.

As shown in FIG. 4a, it is possible to know that the case of using the liquid refrigerant as the guest material G shows a notably high reaction speed (that is, a temperature-increasing speed) than that of the case of using the gaseous refrigerant. This is because a speed of forming reaction of hydrates becomes higher when using a liquid refrigerant having a relatively higher speed than that of the gaseous one due to properties of hydrates in which a reaction speed is proportional to contact frequency between the host material H and the guest material G.

Also, it may be known that the case of employing the pulverizer 60 according to the present invention shows a notably high reaction speed even when the same liquid refrigerants are used as the guest material G. It is determined that this is because a reaction area (that is, a contact area) between the host material and the guest material pulverized into micro-sized particles by the pulverizer 60 increases as described above. It is expected that a difference in reaction speeds described above may identically occur in a case of using the same gaseous guest material G.

Also, FIG. 4b illustrates pictures obtained by taking a picture of a state of hydrates actually formed in each of the cases of FIG. 4a. It may be known that water content of hydrates is low (that is, forming efficiency of hydrates is high) in order like the order of high reaction speeds shown in the graph of FIG. 4a.

Accordingly, it may be known from the results that when the gaseous or liquid guest material is used, forming efficiency of hydrates is notably improved in the case of using the pulverizer 60 according to the present invention than the case of using no pulverizer 60. Additionally, it may be known that forming efficiency of hydrates is further improved in the case of using the liquid guest material than the case of using the gaseous guest material.

FIGS. 5 and 6 are cross-sectional views illustrating configurations of hydrate forming apparatuses according to a second embodiment and a third embodiment of the present invention, respectively. In the case of these embodiments, since there is a difference from the first embodiment described above only in a configuration of the main body, like reference numerals refer to like elements and a repeated description thereof will be omitted.

As described above with reference to the experiment results of FIG. 4a, since a forming reaction of hydrates is an exothermal reaction, even when the main body 10 that forms the reaction space 11 is maintained at pressure and temperature adequate for forming hydrates, an increase in temperature caused by forming of hydrates occurs in the reaction space 11.

Accordingly, in the second embodiment and the third embodiment shown in FIGS. 5 and 6, a cooling apparatus for quickly removing formation heat (that is, reaction heat) of hydrates is further installed in the main body 10 to further increase forming efficiency of the hydrates.

For this, first, in the second embodiment shown in FIG. 5, the main body 10 is configured to include a first body 15a that forms the reaction space 11 therein, a second body 15b formed in a jacket structure at an outer surface of the first body 15a to form a cooling space 16b between the second body 15b and the first body 15a, and cooling modules 16a, 16c, and 17 that maintain a temperature of the inside of the reaction space 11 to be within a predetermined temperature range by moving a cooling fluid to the cooling space 16b.

Also, the cooling modules 16a, 16c, and 17 include an inflow pipe 16a through which the cooling fluid flows into the cooling space 16b, an outflow pipe 16c through which the cooling fluid that absorbs formation heat of hydrates in the reaction space 11 in a process of flowing through the cooling space 16b is discharged, and a cooling pump 17 that supplies the cooling fluid at low temperature from an external cooling fluid source (not shown) to the inflow pipe 16a. The cooling fluid may be a flowable thermal medium that includes air or water.

Meanwhile, in the third embodiment shown in FIG. 6, a thermoelement module 18 for controlling temperature is further installed on at least one side of the first body 15a in the second embodiment shown in FIG. 5.

In this case, the thermoelement module 18 may be configured to allow a cooling surface to perform a function of offsetting formation heat of the reaction space and an exothermic surface to be cooled by the cooling fluid that flows through the cooling space 16b by installing the cooling surface to face the reaction space and the exothermic surface to face the cooling space.

Also, although not shown in the drawings, as a fourth embodiment of the present invention, a hydrate forming apparatus may be configured to install the thermoelement module 18 described in the third embodiment of FIG. 6 on at least one side of the side surface 13 of the main body 10 in the first embodiment described above. In this case, the exothermic surface of the thermoelement module 18 is configured to be cooled by outside air.

Also, in the second to fourth embodiments of the present invention described above, it has been described as one example that the thermoelement module 18 is installed at a side part of the main body 10. However, when necessary, the thermoelement module 18 may be installed at a top surface and a bottom surface of the main body 10 and also at the inlet pipe 20.

Lastly, FIG. 7 is a block diagram illustrating a configuration of a water treatment apparatus using the hydrate forming apparatus according to the first to fourth embodiments of the present invention.

The water treatment apparatus according to the present invention uses a principle of forming hydrates and includes a chemical reactor 110 that forms and discharges hydrates in an internal reaction space, a host material supplier 140 that supplies target water for treatment that is a host material H for forming the hydrates to the reaction space in the chemical reactor, a guest material supplier 150 that supplies a guest material G for forming the hydrates to the reaction space in the chemical reactor 110, a dehydrator 120 that dehydrates the discharged hydrates, and a dissociator 130 that dissociates the dehydrated hydrates into treated water and a guest material and discharges the treated water and the guest material.

Here, the chemical reactor 110 is configured to include a main body (not shown) that forms a reaction space therein and a pulverizer (not shown) installed in the reaction space and configured to pulverize a target material of pulverization that is at least one of the host material H and the guest material G that flow into the reaction space to increase a reaction area for forming the hydrates. The chemical reactor 110 may be preferably implemented by any one of the hydrate forming apparatuses according to the first to fourth embodiments described above and a repeated description will be omitted.

Also, the host material supplier 140 is for supplying contaminated water or seawater that is target water for treatment to the chemical reactor 110 as described above in the first embodiment. As described in the first embodiment, a pump 142 for supplying the host material H and a valve system 143 for controlling a supply amount may be provided at a supply pipe (not shown).

Also, the guest material supplier 150 is for supplying any one of gaseous and liquid guest materials to the chemical reactor 110 as described above in the first embodiment. As described in the first embodiment, a pump 152 for supplying the guest material G and a valve system 153 for controlling a supply amount may be provided at a supply pipe (not shown).

In the embodiment, like the first to fourth embodiments described above, it will be described as one example that seawater is used as the host material and a gaseous or liquid refrigerant HFC-134a is used as the guest material.

Meanwhile, the dehydrator 120 performs a function of dehydrating the hydrates to remove impurities adsorbed onto the hydrates discharged from the chemical reactor 110. In this process, the seawater that does not react with the guest material (that is, HFC-134a) is dehydrated.

The dehydrator 120 is configured to perform dehydration while transporting the hydrates using a screwing method like a general method. Since a configuration of the dehydrator, a dehydration method, and an effect of dehydration are well-known technologies, a detailed description thereof will be omitted here.

Meanwhile, the hydrates that undergo the dehydration are transferred to the dissociator 130. The dissociator 130 performs a function of dissociating the hydrates in a high-temperature and low-temperature conditions to separate the hydrates into treated water (for example, pure water or fresh water) and the guest material. Since a configuration of the dissociator, a dissociation method, and an effect of dissociation are well-known technologies, a detailed description thereof will be omitted here.

Merely, in the embodiment, when the chemical reactor 110 is configured in the jacket type in which the cooling space 16b is formed between a first body 15a and a second body 15b of the main body 10 like the second or third embodiment, the dissociator 130 may also be configured in a jacket structure in which a heating space (not shown) is formed between an internal body (not shown) and an external body (not shown) formed on an outer surface of the internal body.

In this case, the water treatment apparatus according to the embodiment may be configured to further include a waste heat circulation module 160 that configures a closed loop using the cooling space 16b and the heating space and circulates a cooling fluid (or a thermal medium) throughout the closed loop using a circulation pump 165.

In the waste heat circulation module 160, the cooling fluid repeats a process of transferring formation heat of the hydrates absorbed while flowing through the cooling space to the heating space to provide calories necessary for a dissociation process and transferring the cold absorbed from the dissociator to the cooling space through heat transfer in the heating space to heat-exchange with the hydrate formation heat, thereby minimizing energy consumed for water treatment.

Also, the water treatment apparatus according to the embodiment is configured to further include a collector 170 that collects the guest material G discharged from the dissociator 130 and supplies the guest material G to the guest material supplier 150 again. In the embodiment, when a liquid refrigerant is used as the guest material G, the collector liquefies the guest material G discharged in a gaseous phase at low temperature and high pressure conditions to supply again to the guest material supplier 150.

INDUSTRIAL APPLICABILITY

The present invention uses a principle of forming gaseous hydrates and may be usefully applied to the industrial field of water treatment such as purification of waste water or sewage and desalination of seawater.

The invention claimed is:

1. A hydrate forming apparatus comprising:
a main body in which a reaction space in which hydrates are formed is provided;
an inlet pipe connected to one side of the main body and through which a host material and a guest material for forming the hydrates flow into the reaction space;
an outlet pipe connected to another side of the main body and through which the hydrates formed in the reaction space are discharged outward; and
a pulverizer installed in the reaction space and configured to transfer a target material of pulverization, which is at least one of the host material and the guest material that flow into the reaction space, toward the outlet pipe through a narrow path using a rotational centrifugal force and pulverize the target material of pulverization into micro-sized particles to increase a reaction area for forming the hydrates.

2. The hydrate forming apparatus of claim 1, wherein the pulverizer comprises:
a stator fixedly installed in the reaction space and with a center connected to the inlet pipe, through which the target material of pulverization flows into the stator; and
a rotor installed at the center of the stator to be rotatable and configured to accommodate the target material of pulverization that flows into the reaction space in the rotor, and
wherein an outer surface of the rotor and an inner surface of the stator are spaced apart at a certain gap, and a plurality of flow channels through which the target material of pulverization accommodated in the rotor is discharged into the gap by a rotational centrifugal force are formed at a side surface of the rotor.

3. The hydrate forming apparatus of claim 2, wherein a plurality of flow channels through which the target material of pulverization discharged into the gap is discharged into the reaction space are formed at a side surface of the stator.

4. The hydrate forming apparatus of claim 1, wherein the pulverizer comprises a rotor installed in the reaction space to be rotatable and configured to accommodate the target material of pulverization that flows through a center connected to the inlet pipe in the rotor, and
wherein an outer surface of the rotor and an inner surface of the main body are spaced apart at a certain gap, and a plurality of flow channels through which the target material of pulverization accommodated in the rotor is discharged into the gap by a rotational centrifugal force are formed at a side surface of the rotor.

5. The hydrate forming apparatus of claim 1, wherein the host material is contaminated water or seawater that is target water of treatment, and
wherein the guest material is at least one of gaseous or liquid SF6, CFC-based materials, HCFC-based materials, PFC-based materials, and HFC-based materials.

6. The hydrate forming apparatus of claim 1, wherein a thermoelement module that maintains a temperature inside the inlet pipe or the reaction space to be within a predetermined temperature range is installed on at least one side of the inlet pipe and the main body, and
wherein a cooling surface of the thermoelement module is installed toward the inside of the inlet pipe or toward the reaction space, and an exothermic surface of the thermoelement module is installed toward the outer surface of the inlet pipe or the main body.

7. The hydrate forming apparatus of claim 1, wherein the main body comprises:
a first body that forms the reaction space therein;
a second body formed in a jacket structure at an outer surface of the first body to form a cooling space between the first body and the second body; and
a cooling module that allows a cooling fluid to flow through the cooling space to maintain a temperature inside the reaction space to be within a predetermined temperature range.

8. The hydrate forming apparatus of claim 7, wherein the main body further comprises a thermoelement module installed on at least one side of the first body, and
wherein a cooling surface of the thermoelement module is installed toward the reaction space and an exothermic surface of the thermoelement module is installed toward the cooling space.

9. A water treatment apparatus comprising:
a chemical reactor that forms hydrates in a reaction space therein and discharges the hydrates through an outlet pipe;
a host material supplier that supplies target water of treatment that is a host material for forming the hydrates to the reaction space in the chemical reactor;
a guest material supplier that supplies a guest material for forming the hydrates to the reaction space in the chemical reactor;
a dehydrator that dehydrates the discharged hydrates; and
a dissociator that separates the dehydrated hydrates into treated water and the guest material and discharges the treated water and the guest material,
wherein the chemical reactor comprises a main body that forms a reaction space therein and a pulverizer installed in the reaction space and configured to transfer a target material of pulverization, which is at least one of the host material and the guest material that flow into the reaction space, toward the outlet through a narrow path using a rotational centrifugal force and pulverize the target material of pulverization into micro-sized particles to increase a reaction area for forming the hydrates.

10. The water treatment apparatus of claim 9, wherein the main body comprises:
a first body that forms the reaction space therein;
a second body formed in a jacket structure at an outer surface of the first body to form a cooling space between the first body and the second body; and
a cooling module that allows a cooling fluid to flow through the cooling space to maintain a temperature inside the reaction space to be within a predetermined temperature range.

11. The water treatment apparatus of claim 10, wherein the main body further comprises a thermoelement module installed on at least one side of the first body, and wherein a cooling surface of the thermoelement module is installed toward the reaction space and an exothermic surface of the thermoelement module is installed toward the cooling space.

12. The water treatment apparatus of claim 10, wherein the dissociator has a jacket structure in which a heating space is formed between an internal body that forms a dissociation space in the dissociator and an external body formed on an outer surface of the internal body, and
wherein the cooling module is configured to circulate a cooling fluid through the cooling space of the main body of the chemical reactor and the heating space of the dissociator.

13. The water treatment apparatus of claim 9, wherein a thermoelement module that maintains a temperature inside the reaction space to be within a predetermined temperature range is installed on at least one side of the main body, and
wherein a cooling surface of the thermoelement module is installed toward the reaction space and an exothermic surface of the thermoelement module is installed toward an outer surface of the main body.

14. The water treatment apparatus of claim 9, further comprising a collector that collects the guest material discharged from the dissociator and supplies the guest material to the guest material supplier again.

15. The water treatment apparatus of claim 14, wherein the guest material supplied to the reaction space is at least one of liquid $SF_6$, CFC-based materials, HCFC-based materials, PFC-based materials, and HFC-based materials, and wherein the collector liquefies a gaseous guest material collected from the dissociator and supplies the guest material to the guest material supplier again.

16. The water treatment apparatus of claim 9, wherein the pulverizer comprises:
a stator fixedly installed in the reaction space and with a center through which the target material of pulverization flows into the stator; and
a rotor installed at the center of the stator to be rotatable and configured to accommodate the target material of pulverization that flows into the reaction space in the rotor, and
wherein an outer surface of the rotor and an inner surface of the stator are spaced apart at a certain gap, and a plurality of flow channels through which the target material of pulverization accommodated in the rotor is discharged into the gap by a rotational centrifugal force are formed at a side surface of the rotor.

17. The water treatment apparatus of claim 16, wherein a plurality of flow channels through which the target material of pulverization discharged into the gap is discharged into the reaction space are formed at a side surface of the stator.

18. The water treatment apparatus of claim 9, wherein the pulverizer comprises a rotor installed in the reaction space to be rotatable and configured to accommodate the target material of pulverization that flows into the rotor therein, and
wherein an outer surface of the rotor and an inner surface of the reaction space are spaced apart at a certain gap, and a plurality of flow channels through which the target material of pulverization accommodated in the rotor is discharged into the gap by a rotational centrifugal force are formed at a side surface of the rotor.

* * * * *